W. M. HUGHES.
Fiber Separating Machines.
No. 152,289. Patented June 23, 1874.
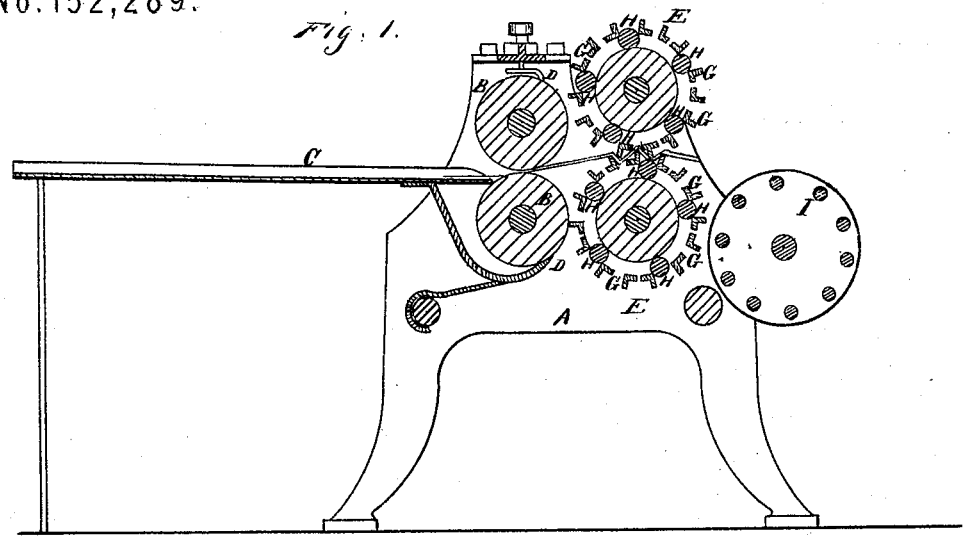
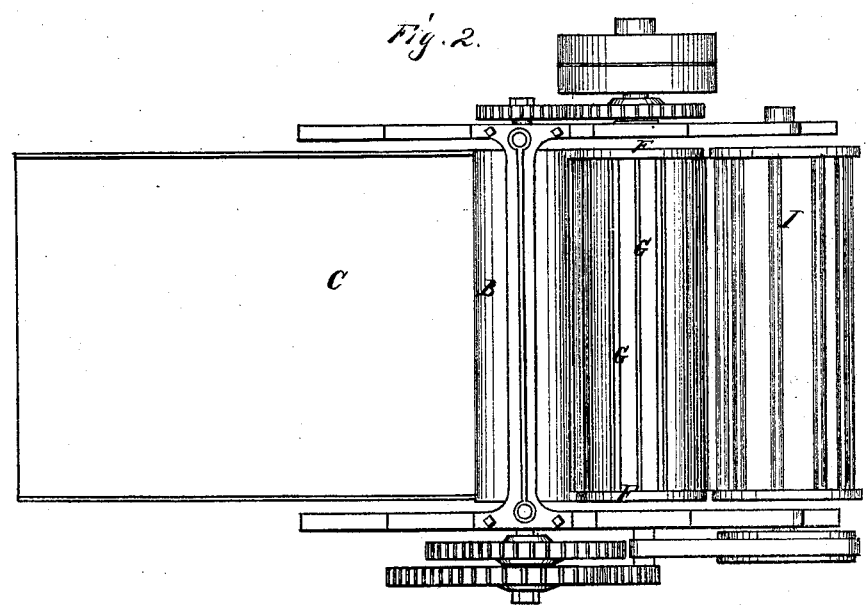
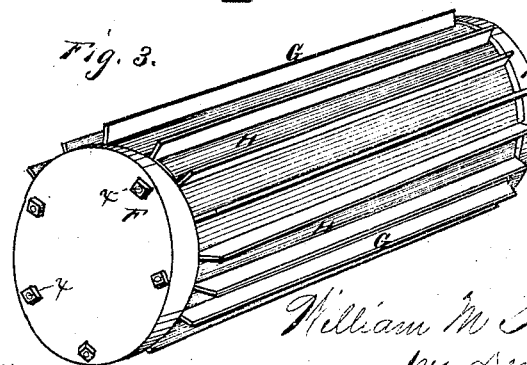
Witnesses
John L. Boone
C. M. Richardson
William M. Hughes
per Dewey & Co.
Att'ys

UNITED STATES PATENT OFFICE.

WILLIAM M. HUGHES, OF SAN FRANCISCO, CALIFORNIA.

IMPROVEMENT IN FIBER-SEPARATING MACHINES.

Specification forming part of Letters Patent No. 152,289, dated June 23, 1874; application filed March 31, 1874.

*To all whom it may concern:*

Be it known that I, WILLIAM M. HUGHES, of San Francisco city and county, State of California, have invented a Ramie-Machine; and I do hereby declare the following description and accompanying drawings are sufficient to enable any person skilled in the art or science to which it most nearly appertains to make and use my said invention or improvement without further invention or experiment.

My invention relates to an improved machine for breaking and dressing fibrous plants, in order to separate the fiber and reduce it to a condition suitable for commercial and manufacturing purposes. My improved machine is especially intended for the treatment of the ramie-plant, but it can also be used for treating flax, hemp, and other fibrous plants.

Referring to the accompanying drawings, Figure 1 is a longitudinal section of my machine in elevation. Fig. 2 is a plan view. Fig. 3 is a perspective of my breaking-roller in a modified form.

A is a strong frame, which is conveniently formed to support the journals of the rollers and other portions of mechanism in their proper relation to each other. B B are two smooth-surfaced rollers, which are supported by journals at the front of the machine, one above the other. The boxes which support the journals of these rollers are secured in guides in the frame A, and an elastic cushion or spring is placed in the guides back of the boxes, in the usual way, so as to allow the rollers to be pressed apart by the material which is being passed through between them. A set-screw regulates the pressure of the rollers together. These rollers I call the squeezing and crushing rollers, as they squeeze out the mucilage from the plants, and crush them at the same time, preparatory to passing them to the scutching-rollers. C is a feeding table or trough, from which the plants or stalks are fed to and between the rollers. D D are scrapers, which remove the mucilage from the rollers B B. The lower scraper may be made in the form of a trough, and secured to the table C, so as to catch and convey the mucilage to a receiving-vessel. From the presser-rollers B, the pressed plants or stalks pass between the scutching-rollers E. The presser-rollers B rotate slowly, while the breaking-rollers E move more rapidly, thus slowly feeding the stalks to the scutchers, and causing them to scrape the plants or stalks.

The breaking-rollers I construct in the following manner: F F are end disks, which are firmly secured to the shaft upon which they revolve. At intervals I connect these disks together by rods, which extend across parallel with the shaft upon which the disks are secured, the ends of the rods being attached to the disks a short distance inside of their outer rim. Upon each of these rods I slip an elastic tube, H, previous to securing them in place in the disks. Upon each side of each of the elastic tubes H, and parallel with them, I secure a blade, G, so that its edge will stand above the outer rim of the disks, and midway between each of the tubes H, I secure another blade, H, also parallel with them. I prefer to employ angle-iron for these blades, as it is stronger and more easily applied than ordinary plain blades. To secure the blades in place, I cut a recess in the disks upon each side of each of the elastic tubes, and another midway between them, which is as deep as the thickness of the angle-iron. I then cut away from each end of the angle-iron a portion equal to the thickness of the disks, and extending from one edge to the angle or bend. The projecting half of the blade will then fit in the recess in the disks, and lie flush with its outer rim. I then shrink a band or tire around the disks, so as to firmly fasten and hold the blades in place.

It will thus be seen that I construct a skeleton roller, and combine in each roller both the elastic cushion and the scraping-knives, as will be more fully shown hereafter.

In the machine I arrange two of these skeleton rollers, one above the other, so that the intermediate knives of each roller will mesh between the narrow blades of the opposite roller, and thus cause their edges to press against the elastic tubes H. These tubes, being loosely placed upon the rod, can turn, and thus present new surfaces to the knives. The skeleton or breaking rollers are made yielding in the same manner as above described for the smooth rollers.

By this construction I am enabled to provide the soft bed or elastic cushion used in hand cleaning, and also to accommodate the machine to the varying sizes of the stalks or plants, while the alternate action of the upper and lower scutching-knives will scrape and clean both the upper and lower surfaces of the stalks or plants, as they pass between the rollers. The action of the interlocking knives is to bend and break the flattened stalks or plants short across their edges, so as to detach the woody particles from the fiber, and leave them in a condition to be stripped out by the next knives. The action is not such as to make tow or waste, and is very complete. As the flat mass or belt of fiber passes through the roller E, it will bend down toward the floor until the opposite ends are released from the rollers B, when the superior speed of the rollers E will draw the last end through rapidly, and fling it over the reel I, which should be far enough removed from the breaking-rollers for this purpose. The smooth rollers B B exert a very heavy pressure upon the stalks, and the advantage is threefold. First, the pressure has a tendency to spread the fiber out laterally, but gives none of the longitudinal or injurious pulling which would be produced by fluted or corrugated rollers; second, the epidermis or skin is so separated that it is comparatively easy for the breaking-rollers to remove it; and, third, the very finest of the fiber, which lies next to the wood, is disengaged, so that it is not lost or wasted.

I am aware that smooth-surfaced rollers have been heretofore used for feeding flax and hemp to scutching-rollers, and I am also aware that the insertion of metallic plates on opposing rollers, so that the plates mesh with each other to form scutchers, has been practiced on flax and hemp machines; these devices, therefore, I do not claim; but What I do claim, and desire to secure by Letters Patent, is—

1. The arrangement, in relation to a ramie or hemp breaking machine, of rollers having a series of cushions formed of elastic tubes H H arranged upon the rods $x$ $x$, the ends of said rods having bearings in the disks F F, as set forth.

2. The breaking-rollers provided with rigid knives or scrapers, and also having elastic cushions so arranged that said knives or scrapers of one of the breaking-rollers will operate against the elastic cushions of the opposing breaking-roller, substantially as set forth.

In witness whereof I hereunto set my hand and seal.

WILLIAM M. HUGHES. [L. S.]

Witnesses:
　JOHN L. BOONE,
　C. M. RICHARDSON.